United States Patent [19]

Gomyo et al.

[11] 4,035,332

[45] July 12, 1977

[54] WATER-SOLUBLE SILICONE-MODIFIED RESIN COMPOSITIONS

[75] Inventors: Shiro Gomyo; Iehiro Kodama, both of Annaka, Japan

[73] Assignee: Shin-Etsu Chemical Co., Tokyo, Japan

[21] Appl. No.: 616,210

[22] Filed: Sept. 24, 1975

[30] Foreign Application Priority Data

Feb. 10, 1974    Japan .............................. 49-113430

[51] Int. Cl.² ..................... C08K 5/05; C08K 5/06; C08K 5/67
[52] U.S. Cl. ...................... 260/33.2 SB; 260/23 R; 260/29.6 R; 260/30.4 N; 260/30.4 SB; 260/30.8 DS; 260/32.6 R; 260/32.6 N; 260/32.8 SB; 260/33.4 SB
[58] Field of Search ............. 260/32.8 SB, 33.2 SB, 260/33.4 SB

[56] References Cited

U.S. PATENT DOCUMENTS

| 3,044,980 | 7/1962 | Modic et al. ................. 260/33.4 SB |
| 3,527,723 | 9/1970 | Stroth et al. ................. 260/33.4 SB |

*Primary Examiner*—Harry Wong, Jr.
*Attorney, Agent, or Firm*—Toren, McGeady and Stanger

[57] ABSTRACT

The water-soluble, silicone-modified resin compositions comprise (a) an interpolymer with an acid value of 10 to 150 prepared by the reaction of a polyol, a polybasic carboxylic acid or an anhydride thereof and an alkoxy- or hydroxy-containing organosilicon compound, (b) a water-miscible organic solvent and (c) a basic compound in an amount sufficient to decrease the acid value of component (a) to below 5 or preferably to zero. The compositions, when diluted with water as desired, are useful as a water-soluble varnishes or a water-soluble paint vehicles capable of forming coating films with excellent weathering resistance, heat-stability, anti-corrosion, solvent resistance and other properties.

7 Claims, No Drawings

WATER-SOLUBLE SILICONE-MODIFIED RESIN COMPOSITIONS

FIELD OF THE INVENTION

This invention relates to water-soluble resin compositions modified with silicones, capable of forming films with excellent weathering resistance, heat-stability, anti-corrosion, solvent resistance and other properties.

DESCRIPTION OF THE PRIOR ART

Various silicone-modified polyester resins readily soluble in water have been developed. These modified resins are not satisfactory for practical use due to their inferior heat-stability in comparison with the silicone-modified polyester resins soluble in organic solvents.

Several methods have been proposed to solubilize in water, some silicone-modified organic copolymer resins other than the polyester resins, utilizing the graft-copolymerization of unsaturated carboxylic acids, such as, acrylic acid and methacrylic acid, or their esters or monomeric phosphate or phosphite esters having an aliphatic double bond and a hydroxy group in a molecule onto the silicone-modified organic resins and other means to combine the components. (See Japanese Patent Publications No. 7705/1971, No. 8230/1972 and No. 13185/1972.) Those methods, however, have failed to produce water-soluble silicone-modified resins having more excellent heat-stability and weathering resistance than the conventional silicone-modified polyester resins which are soluble in organic solvents.

Generally speaking, it is a trend that organosilicon compounds having excellent weathering resistance, heat-stability, anti-corrosion and solvent resistance are disadvantageous since they are hydropholic and possess a poor affinity for water. In contrast, those having a good affinity for water are relatively inferior in weathering resistance, heat-stability anti-corrosion and anti-solvent resistance.

OBJECT OF THE INVENTION

The object of the present invention is to provide a water-soluble silicone-modified resin composition free from the above problems encountered in the prior art methods.

SUMMARY OF THE INVENTION

The water-soluble silicone-modified resin composition of the invention comprises a. from 20 to 90 parts by weight of an interpolymer having an acid value of from 10 to 150 prepared by the reaction of
 i. a polyol,
 ii. a polybasic carboxylic acid or an anhydride thereof, and
 iii. an organosilicon compound represented by the average unit formula

$$R^1_a(R^2O)_b SiO_{\frac{4-a-b}{2}} \quad (I)$$

where $R^1$ is a substituted or unsubstituted monovalent hydrocarbon group, $R^2$ is a hydrogen atom or a substituted or unsubstituted monovalent hydrocarbon group, $a$ is a positive number between 1 and 3 inclusive and $b$ is a positive number between 0.01 and 3 inclusive with the proviso that $(a + b)$ is between 1.01 and 4 inclusive.

b. from 80 to 10 parts by weight of a water-miscible organic solvent, and c. a basic compound in an amount sufficient to reduce the acid value of component (a) to below 5.

DETAILED DESCRIPTION OF THE INVENTION

To describe the invention in further detail, the inventors have conducted extensive investigations to obtain water-soluble silicone-modified resin compositions having excellent weathering resistance, heat-stability, anti-corrosion and solvent resistance. As a result, they have discovered that the compositions comprising components (a) to (c) above are satisfactory to fulfill all the above requirements despite their very good solubility in water, and have an excellent film-forming property and that the resultant films have very superior properties of heat-stability, weathering resistance, anti-corrosion, anti-solvent, antichemical and anti-staining. It has also been discovered that the aqueous solution of the composition is very stable and free from turbidity even after prolonged storage.

Component (a) of the composition in accordance with the invention is an interpolymer obtained by the reaction of a polyol, a polybasic carboxylic acid or an anhydride thereof and an organosilicon compound represented by the average unit formula (I). The acid value of component (a) should be within a range from 10 to 150 or, preferably, from 20 to 80. The reason for this range is that if component (a) has an acid value smaller than 10, it cannot impart sufficient water-solubility to the composition. On the other hand, if component (a) possesses an acid value larger than 150, it imparts poorer heat-stability, weathering resistance, anti-corrosion and anti-solvent resistance to the composition.

The polyols as one of the reactants to form component (a) are exemplified by ethyleneglycol, propyleneglycol, 2,2-dimethylpropanediol (neopentylglycol), glycerine, trimethylolethane, trimethylolpropane, 1,2,6-hexanetriol, pentoerithritol, sorbitol, diglycerine and tris(2-hydroxyethyl)isocyanurate.

The polybasic carboxylic acids or the anhydrides thereof as the second reactant to form component (a) are exemplified by phthalic anhydride, isophthalic acid, terephthalic acid, tetrahydrophthalic anhydride, maleic anhydride, fumaric acid, trimellitic anhydride, succinic acid, adipic acid, sebacic acid, hexahydrophthalic anhydride and 3,6-endmethylenetetrahydrophthalic anhydride.

The organosilicon compounds as the third reactant to form the component (a) are organosilanes or organopolysiloxanes represented by the average unit formula (I) above, where $R^1$ is a monovalent hydrocarbon group, such as, alkyl groups exemplified by methyl, ethyl, propyl and butyl groups, alkenyl groups exemplified by vinyl and allyl groups and aryl groups exemplified by the phenyl group or any one of the above groups substituted by an atom or atoms of halogen, $R^2$ is a hydrogen atom or a substituted or unsubstituted monovalent hydrocarbon group of the same definition as for $R^1$, $a$ is between 1 and 3 inclusive and $b$ is between 0.01 and 3 inclusive with the proviso that $(a + b)$ is between 1.01 and 4 inclusive. Several examples of the organosilicon compounds suitable for the purpose include alkoxy-containing organosilanes, such as, diphenyldimethoxysilane, phenylmethyldiethoxysilane, dimethyldiethoxysilane, phenyltriethoxysilane, methyltripropoxysilane, propyltriethoxysilane, vinylmethyldiethoxysilane and 3-chloropropylmethyldimethoxysilane, silanols, such as, diphenylsilanediol and diphenylmethylsilanol, organopolysiloxanes having hydroxy and/or alkoxy groups bonded to the silicon atoms prepared by the known method of hydrolysis-condensation of one or a mixture of the hydrolyzable organosilanes selected from the class consisting of the alkoxy-containing organosilanes as set forth above and organohalosilanes, such as, methyltrichlorosilane, dimethyldichlorosilane, phenyltrichlorosilane, diphenyldichlorosilane, phenylmethyldichlorosilane and propyltrichlorosilane, tris(phenylmethylmethoxysiloxy)phenylsilane, 1,5-dimethyl-1,3,5-triphenyl-1,3,5-trimethoxytrisiloxane, 1,5-diphenyl-1,5-dimethyl-3-vinyl-1,3,5-trimethoxytrisiloxane, and linear diorganopolysiloxanes composed of dimethylsiloxane and/or methylphenylsiloxane units and terminated at both chain ends with hydroxy or alkoxy groups bonded to the terminal silicon atoms, e.g., hydroxy-terminated linear methylphenylpolysiloxane expressed by the formula

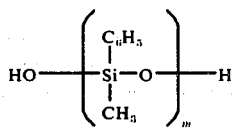

where $m$ is a positive integer from 2 to 6 and a methoxy-terminated dimethylpolysiloxane expressed by the formula

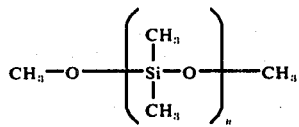

where $n$ is a positive integer from 2 to 4.

Reactions for the preparation of component (a) may be carried out in any known ways so long as the acid value of the resultant interpolymer is within the range specified above. For example, a polyol and a polybasic carboxylic acid or an anhydride thereof are brought into reaction to form an ester in such a manner that the hydroxy groups of the polyol would remain in an amount equimolar to the functional groups of the organo-silicon compound to be reacted in the next step and that the acid value of the resultant interpolymer would be within the desired range, and then the reaction of the organosilicon compound and the ester obtained above is performed under heating. The end point of the reaction above is determined by measuring the acid value of the reaction mixture at intervals during the reaction process. Other measures for the end point of the reaction are that the films formed from the reaction product will become clear and the gellation time of the reaction product is within the range from 30 to 180 seconds at 200° C.

In component (a) of the present composition, it is preferable that the molecules of the organosilicon compound are bonded to the backbone of the molecules of the interpolymer and the carboxyl groups of the polybasic carboxylic acid or the anhydride of a polybasic carboxylic acid are bonded to the molecules of the interpolymer at the terminals of the molecules. A recommended procedure to realize the above molecular configuration is such that the polyol and the organosilicon compound are first reacted to the extent that most of the functional groups of the organosilicon compound have been consumed in the reaction with the polyol and then the polybasic carboxylic acid or the acid anhydride is subjected to the reaction with the residual hydroxy groups of the polyol.

Generally speaking with respect to the reaction velocities among the reactants, the velocity of the condensation reaction between the functional groups of the organosilicon compound and the hydroxy groups of the polyol is much lower than the velocity of the condensation reaction between the polyol and the polybasic carboxylic acid or the acid anhydride. However, it may be possible from the standpoint of industrial productivity that the three reactants be simultaneously charged into the reaction vessel and subjected to the reaction.

In the above reactions, the ratio of the reactants is such that from 10 to 80% by weight or, preferably, from 30 to 50% by weight of the organosilicon compound, is brought into reaction with from 90 to 20% by weight or, preferably, from 70 to 50% by weight of the total amount of the polyol and the polybasic carboxylic acid or the acid anhydride. When the ratio is outside the above range, no desirable results can be expected with respect to the water solubility, solvent resistance, weathering resistance and heat-stability of the resultant compositions.

Incidentally the polybasic carboxylic acid or the acid anhydride above may be admixed, if necessary, with a small amount of a fatty acid, such as, linseed oil fatty acid, safflower oil fatty acid, dehydrated castor oil fatty acid, coconut oil fatty acid, soybean oil fatty acid, tall oil fatty acid, tung oil fatty acid, lauric acid, linolenic acid and palmitic acid.

Furthermore, the above reaction is accelerated by a catalyst, such as, p-toluene sulfonic acid, trifluoroacetic acid and an alkyl titanate exemplified by tetrapropyltitanate. By the use of the catalyst, the reaction product of the purpose is obtained at a relatively low temperature and within a relatively short time.

Component (b) of the composition is a watermiscible organic solvent, such as, aliphatic alcohols exemplified by methanol, ethanol, propanol and butanol, glycols and monoalkyl ethers of glycols exemplified by ethyleneglycol, propyleneglycol, diethyleneglycol, ethyleneglycol monomethyl ether, ethyleneglycol monoethyl ether, ethyleneglycol monopropyl ether, ethyleneglycol monobutyl ether, diethyleneglycol monoethyl ether and propyleneglycol monomethylether, tetrahyrofuran, ketones exemplified by acetone and methylethylketone, dioxane, dimethylsulfoxide and dimethylacetamide. They are employed either singly or as a mixture of two or more.

The basic compound as component (c) of the composition is employed to reduce the acid value of component (a) to 5 or less. It has a boiling point preferably below 200° C. Such basic compound suitable for the purpose are exemplified by trimethylamine, triethylamine, dipropylamine, dimethylethanolamine, diethylethanolamine, triethanolamine and ammonia.

The composition of the present invention is prepared by merely blending components (a), (b) and (c) under ordinary conditions in an arbitrary order. The blending ratio of components (a) and (b) in the composition is such that from 20 to 90% by weight or, preferably, from 50 to 70% by weight of component (a) is blended with from 80 to 10% by weight or, preferably, from 50 to 30% by weight of component (b) in order to attain the intended properties of the composition to a full extent. The amount of component (c) is such that the acid value of component (a) is made substantially smaller than 5.

The composition of the present invention thus prepared is useful as a vehicle or paints, but the composition itself can provide, when cured with sufficient crosslinking, coating films having excellent physical properties.

The compositions of the present invention can be used in several different ways. For example, the compositions are employed as a water-soluble coating material with dilution, if necessary, with water. For another example, the compositions are employed with admixture of water-soluble aminoplast resins, such as, alkoxymethylmelamine and partially-alkylated methylmelamine which are crosslinking agents for the usual water-soluble resin compositions. For a further example, organic or inorganic pigments are added to the composition to formulate a paint.

Coating procedures suitable for the application of the compositions of the present invention to substrate surfaces include electrophoresis, electrostatic coating, dipping, roller coating, spraying and flow coating. The composition applied on a substrate surface may be cured by heating them up to 130° to 250° for 3 to 60 minutes.

The addition of the above-mentioned crosslinking agent to the composition of the present invention has the advantages that the curing of the composition can be performed at a relatively low temperature within a short time so that the coating films can be sufficiently hardened and the resultant cured films having a three-demensional network structure can adhere to the substrate surface very tightly, exhibiting various excellent properties.

Taking advantage of the superior heat-stability, weathering resistance, anti-corrosion and solvent resistance of the coating films obtained from the composition of the present invention, one can expect a variety of applications, including applications as heat-resisting paints for room heaters, internal combustion engines and accessories and chemical plants and as weathering-resistant paints for outdoor use, and also other special applications, for example, as fixing varnishes for the electric insulation of knitted or woven glass fabrics in glass-sleeved or glass fiberinsulated electric wires.

The following examples illustrate the present invention.

EXAMPLE 1

Into a 4-necked flash equipped with a stirrer, a relfux condenser and a thermometer were put 312 g (3 moles) of neopentylglycol, 146 g (1 mole) of adipic acid, 192 g (1 mole) of trimellitic anhydride and 325 g of xylene. The temperature of the mixture was increased up to 200° C over a period of 2 hours. Then, the reaction was continued for 2 hours while removing the water produced by the condensation reaction from the reaction mixture. The reaction was stopped when the acid value of the reaction mixture reached 80, and the resulting reaction mixture was cooled to 120° C. Thereupon 434 g of tris(phenylmethylmethoxysiloxy)-phenylsilane and 0.5 g of tetrapropyltitanate were added to the reaction mixture, followed by heating up to 130° to 150° C so that the reaction took place while removing the methanol produced by the reaction from the vessel by distillation. When the methanol thus removed amounted to about 55 g, the reaction mixture was cooled down to 100° C and admixed with 400 g of ethyleneglycol monobutyl ether to dissolve the reaction mixture. After completion of dissolution, 130 g of dimethylethanolamine was further added to the mixture, followed by stirring for about 1 hour at room temperature whereby the acid value of the mixture decreased to practically zero. Then, 100 g of hexamethoxymethylmelamine were added and the solid content of the mixture was adjusted to 50% by adding an appropriate amount of water. The thus prepared clear, light yellow varnish had a viscosity of 3,150 centistokes at 25° C. The varnish was diluted 100 times with water but exhibited no turbidity, and the resin possessed excellent solubility in water.

EXAMPLE 2

Into the same 4-necked flash as employed in Example 1 were put 276 g (3 moles) of glycerine, 219 g (1.5 moles) of adipic acid, 296 g (2 moles) of phthalic anhydride, 426 g of dimethyldimethoxysilane and 1.2 g of p-toluene sulfonic acid, and the mixture was heated. The reaction began gradually when the temperature of the mixture reached 80° C, and methanol and water distilled out actively at a temperature around 120° C. The temperature was further increased to 185° C and the reaction was continued at this temperature for a while. When the acid value of the reaction mixture reached 100, the mixture was cooled and 500 g of ethyleneglycol monoethyl ether was added at 100° C to dissolve the mixture, followed by the addition of 234 g of diethylethanolamine to decrease the acid value of the mixture to practically zero and adjustment of the solid content of the mixture to 45% by the addition of an appropriate amount of water. The varnish thus prepared was a clear, light yellow, viscous fluid with a viscosity of 1,260 centistokes at 25° C and could be diluted with water without causing any turbidity.

EXAMPLE 3

Into the same 4-necked flash as employed in Example 1 were put 276 g (3 moles) of glycerine, 444 g (3 moles) of phthalic anhydride, 280 g (1 mole) of linseed oil fatty acid, 700 g of phenylmethyldiethoxysilane and 1.7 g of p-toluene sulfonic acid and the temperature of the mixture was gradually increased. Ethanol began to distil out at about 130° C. The temperature was further increased and the reaction was continued at 190° C until the acid value of the reaction mixture reached 100. Then the reaction mixture was cooled, followed by the addition of 680 g of ethyleneglycol monobutyl ether at 100° C to dissolve the mixture and the addition of 300 g of dimethylethanolamine to decrease the acid value of the mixture to practically zero. The varnish obtained by the dilution with water to a solid content of 50% was a clear, light yellow, viscous fluid having a viscosity of 3,600 centistokes at 25° C.

EXAMPLE 4

Into the same 4-necked flask as employed in Example 1 were put 240 g (2 moles) of trimethylolethane, 249 g (1.5 moles) of isophthalic acid, 146 g (1 mole) of adipic acid, 635 g (1.35 moles) of 1,5-dimethyl-1,3,5-triphenyl-1,3,5-trimethoxytrisiloxane and 1.2 g of p-toluene sulfonic acid, and the temperature of the mixture was gradually increased. The reaction continued at 170° C until the acid value of the reaction mixture reached 60, and then the mixture was cooled, followed by the addition of 250 g of triethanolamine to decrease the acid value of the mixture to practically zero. Then 500 g of ethyleneglycol monopropyl ether was added to dissolve the mixture and the solid content was adjusted to 40% by the addition of an appropriate amount of water. The varnish thus obtained was a clear, light yellow, viscous fluid having a viscosity of 1,130 centistokes at 25° C. It could be diluted infinitely with water without causing any turbidity.

EXAMPLE 5

Into the same 4-necked flask as employed in Example 1 were put 312 g (3 moles) of neopentylglycol, 146 g (1 mole) of adipic acid, 192 g (1 mole) of trimellitic anhydride, 325 g of xylene, 434 g of tris-(phenylmethylmethoxysiloxy)phenylsilane and 0.5 g of tetrapropyltitanate, and the mixture was heated gradually. When the temperature reached 130° C, methanol began to distill out. The temperature was further increased up to 180° C, where the reaction was continued while removing xylene together with the methanol produced by the reaction by distillation until the acid value of the reaction mixture decreased to 50. Then the reaction mixture was cooled down to 100° C and 400 g of ethyleneglycol monobutyl ether was added to dissolve the mixture. After completion of the dissolution, 130 g of dimethylethanolamine was added to decrease the acid value of the mixture to practically zero, followed by the addition of 100 g of hexamethoxymethylmelamine. The mixture was further diluted with water to adjust the solid content to 50%. The varnish thus obtained was a clear, light yellow fluid having a viscosity of 3,020 centistokes at 25° C. It could be diluted 100 times with water without causing any turbidity.

EXAMPLE 6

Into the same 4-necked flask as employed in Example 1 were put 268 g (2 moles) of trimethylolpropane, 370 g (2.5 moles) of phthalic anhydride, 280 g (1 mole) of dehydrated castor oil fatty acid, 280 g (0.56 mole) of a hydroxy-endblocked methylphenylpolysiloxane expressed by the average formula

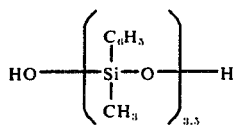

and 0.2 g of tetrabutyltitanate. The mixture was gradually heated to 190° C, where reaction was continued while removing the water produced by the condensation reaction by distillation until the acid value of the reaction mixture reached 20. Then, the reaction mixture was cooled down to 100° C, and 700 g of ethyleneglycol monobutyl ether were added, followed by the further addition of dimethylethanolamine in an amount sufficient to decrease its acid value to practically zero. Further the mixture was diluted with warm water to adjust the solid content to 50%. The varnish thus obtained was a clear, light yellow fluid having a viscosity of 4,300 centistokes at 25° C. It could be diluted 30 times with water without causing any turbidity.

EXAMPLE 7

The varnishes prepared in Examples 1 to 6 were subjected to the various tests as set forth in the following.

TEST 1

The varnishes prepared in Examples 1 to 6 were each diluted with water to have a viscosity suitable for coating. Polished steel plates 50 mm × 150 mm wide and 0.3 mm thick were coated with the varnishes to form a film 27 ± 2μm thick followed by heating at 150° C for 60 minutes to give test pieces coated with the cured films of the varnishes. The coating films thus prepared were tested for various physical properties, with the results as shown in Table I. In the tests, the varnishes of Examples 2 to 6 included dimethyloltetramethoxymethylmelamine added in an amount of 10% each by weight based on the non-volatile matter contained in each varnish.

Table I

|  | Varnish of Example | | | | | |
|---|---|---|---|---|---|---|
|  | 1 | 2 | 3 | 4 | 5 | 6 |
| As cured: | | | | | | |
| Pencil hardness | H | H | HB | H | H | HB |
| Flex resistance | O.K. | O.K. | O.K. | O.K. | O.K. | O.K. |
| Impact resistance | O.K. | O.K. | O.K. | O.K. | O.K. | O.K. |
| Adhesivity | 100/100 | 100/100 | 100/100 | 100/100 | 100/100 | 100/100 |
| Gasoline resistance | O.K. | O.K. | O.K. | O.K. | O.K. | O.K. |
| After heating at 200° C for 2 hours: | | | | | | |
| Pencil hardness | H | H | HB | H | H | HB |
| Flex resistance | O.K. | O.K. | O.K. | O.K. | O.K. | O.K. |
| Impact resistance | O.K. | O.K. | O.K. | O.K. | O.K. | O.K. |
| Adhesivity | 100/100 | 100/100 | 100/100 | 100/100 | 100/100 | 100/100 |
| Gasoline resistance | O.K. | O.K. | O.K. | O.K. | O.K. | O.K. |
| After heating at 250° C for 2 hours: | | | | | | |
| Pencil hardness | 2H | 2H | F | 2H | 2H | F |
| Flex resistance | O.K. | O.K. | O.K. | O.K. | O.K. | O.K. |
| Adhesivity | 100/100 | 100/100 | 100/100 | 100/100 | 100/100 | 100/100 |
| Gasoline resistance | O.K. | O.K. | O.K. | O.K. | O.K. | O.K. |

Notes:
(1) Pencil hardness is symbolized in accordance with Japanese Industrial Standard (JIS).
(2) Flex resistance was determined on a round mandrel 3 mm in diameter.
(3) Impact resistance was determined by the Du Pont type impact tester (500 g load, ½ in., 50 cm).
(4) Adhesivity was determined as follows. The cured film over each polished steel plate was cut into 100 square pieces 1 × 1 mm with a knife. An adhesive tape was applied with pressing over the entire surface of these cut pieces and then peeled off. As a result, the number of cut pieces left unstripped on the substrate is given as the numerator in the fractional expressions.

TEST 2

To each of the clear varnishes prepared in Examples 1 to 6 in an amount of 100 parts by weight based on the non-volatile matter were added 65 parts by weight of titanium dioxide of the rutile type. The mixtures were kneaded homogeneously by a ball mill, to produce white paints. These paints were applied over aluminum plates 50 mm × 150 mm wide and 0.5 mm thick, to form films 33 ±3μm thick. The films were subjected to air-drying for 30 minutes and then to curing at 150° C for 60 minutes. The resultant films were tested for the various properties. The results are shown in Table 2.

Table II

|  | Varnish of Example | | | | | |
|---|---|---|---|---|---|---|
|  | 1 | 2 | 3 | 4 | 5 | 6 |
| Pencil hardness | 2H | 2H | H | 2H | 2H | H |
| Spray with saline water, 96 hours | O.K. | O.K. | O.K. | O.K. | O.K. | O.K. |
| Gasoline resistance | O.K. | O.K. | O.K. | O.K. | O.K. | O.K. |
| Weathering resistance, % reflection: | | | | | | |

Table II-continued

| | Varnish of Example | | | | | |
|---|---|---|---|---|---|---|
| | 1 | 2 | 3 | 4 | 5 | 6 |
| Initial | 92 | 90 | 89 | 94 | 92 | 87 |
| 50 hours | 80 | 80 | 79 | 82 | 78 | 75 |
| 100 hours | 77 | 75 | 76 | 74 | 72 | 69 |
| 150 hours | 76 | 75 | 74 | 73 | 70 | 68 |

Note:
Weathering resistance was determined by a decrease of luster as the result of the dew cycle test with 60° reflection angle.

TEST 3

To each clear varnish used in Test 1 in an amount of 100 parts by weight based on the non-volatile matter was added 100 parts by weight each of calcined mixed oxides of cobalt, chromium, copper and iron. The mixtures were kneaded by a ball mill, to produce white paints. Mat-surfaced steel plates were coated with these black paints so as to form films 25 ± 3μm thick, followed by curing at 150° C for 60 minutes. The resultant films were tested for heat-stability at 700° C, resulting in no changes at all on the appearance of the films.

As is evidently clear from the above test results, the coating films obtained from the compositions in accordance with the present invention have excellent weathering resistance, heat-stability, anti-corrosion and solvent resistance.

What is claimed is:
1. A water-soluble resin composition comprising
   a. from 20 to 90 parts by weight of an interpolymer having an acid value of from 10 to 150 prepared by the reaction of the following reactants,
      i. a polyol selected from the group consisting of ethyleneglycol, propyleneglycol, 2,2-dimethylpropanediol, glycerine, trimethylolethane, trimethylolpropane, 1,2,6-hexanetriol, pentaerithritol, sorbitol, diglycerine, and tris(2-hydroxyethyl)isocyanurate,
      ii. a polybasic carboxylic acid or an anhydride thereof selected from the group consisting of phthalic anhydride, isophthalic acid, terephthalic acid, tetrahydrophthalic anhydride, maleic anhydride, fumaric acid, trimellitic anhydride, succinic acid, adipic acid, sebacic acid, hexahydrophthalic anhydride, and 3,6-endmethylenetetrahydrophthalic anhydride,
      iii. an organosilicon compound represented by the average unit formula

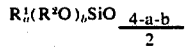

$$R^1_a(R^2O)_b SiO_{\frac{4-a-b}{2}}$$

where $R_1$ is a substituted or unsubstituted monovalent hydrocarbon group selected from the group consisting of methyl ethyl, propyl butyl, vinyl, allyl, and phenyl, $R^2$ is a hydrogen atom or a substituted or unsubstituted monovalent hydrocarbon group selected from the group consisting of methyl, ethyl, propyl, butyl, vinyl, allyl, and phenyl, $a$ is a positive number between 1 and 3 inclusive, and $b$ is a positive number between 0.01 and 3 inclusive with the proviso that $(a + b)$ is between 1.01 and 4 inclusive;
   b. from 80 to 10 parts by weight of a water-miscible organic solvent selected from the group consisting of aliphatic alcohols, glycols, monoalkyl ethers of glycols, and ketones; and
   c. a basic compound selected from the group consisting of trimethylamine, triethylamine, dipropylamine, dimethylethanolamine, diethylethanolamine, triethanolamine, and ammonia in an amount sufficient to reduce the acid value of the component a) to below 5, wherein said component a) is prepared by the reaction of from 10 to 80% by weight of said reactant (iii) and from 90 to 20% by weight as total of said reactants (i) and (ii).

2. The water-soluble resin composition as claimed in claim 1 wherein said organosilicon compound is selected from the class consisting of alkoxy-containing organosilanes, organosilanols and organopolysiloxanes having alkoxy or hydroxy groups bonded directly to silicon atoms.

3. The water-soluble resin composition as claimed in claim 1 wherein said basic compound has a boiling point below 200° C.

4. The water-soluble resin composition as claimed in claim 2 wherein said alkoxy-containing organosilane is selected from the class consisting of diphenyldimethoxysilane, phenylmethyldiethoxysilane, dimethyldiethoxysilane, phenyltriethoxysilane, methyltripropoxysilane, propyltriethoxysilane, vinylmethyldiethoxysilane, and 3-chloropropylmethyldimethoxysilane.

5. The water-soluble resin composition as claimed in claim 2 wherein said organosilanol is selected from the class consisting of diphenylsilanediol and diphenylmethylsilanol.

6. The water-soluble resin composition as claimed in claim 2 wherein said organopolysiloxane is selected from the class consisting of tris(phenylmethylmethoxysiloxy)phenylsilane, 1,5-dimethyl-1,3,5-triphenyl-1,3,5-trimethoxytrisiloxane, 1,5-diphenyl-1,5-dimethyl-3-vinyl-1,3,5-trimethoxytrisiloxane and linear diorganopolysiloxanes terminated at both chain ends with hydroxy groups or alkoxy groups.

7. The water-soluble resin composition as claimed in claim 1 wherein said monoalkyl ether of a glycol is selected from the class consisting of ethyleneglycol monomethyl ether, ethyleneglycol monoethyl ether, ethyleneglycol monopropyl ether, ethyleneglycol monobutyl ether, diethyleneglycol monoethyl ether and propyleneglycol monomethyl ether.

* * * * *

UNITED STATES PATENT OFFICE
CERTIFICATE OF CORRECTION

Patent No. 4,035,332                    Dated  July 12, 1977

Inventor(s)  Shiro Gomyo et al

It is certified that error appears in the above-identified patent and that said Letters Patent are hereby corrected as shown below:

In the heading of the patent [30] should read as follows:

--[30]  Foreign Application Priority Data

October 2, 1974   Japan.......49-113430--.

Signed and Sealed this

Twenty-seventh Day of September 1977

[SEAL]

Attest:

RUTH C. MASON  
Attesting Officer

LUTRELLE F. PARKER  
Acting Commissioner of Patents and Trademarks